US006416588B1

United States Patent
Boles

(10) Patent No.: US 6,416,588 B1
(45) Date of Patent: Jul. 9, 2002

(54) METHOD FOR USING A CAN OF COMPRESSED GAS TO CLEAN A VEHICLE

(76) Inventor: Alan Boles, 5350 Oak Park La., No. 164, Oak Park, CA (US) 91377

( * ) Notice: Subject to any disclaimer, the term of this patent is extended or adjusted under 35 U.S.C. 154(b) by 95 days.

(21) Appl. No.: 09/605,968

(22) Filed: Jun. 29, 2000

(51) Int. Cl.[7] .................................................. B08B 5/00
(52) U.S. Cl. ................................ 134/6; 134/37; 134/42
(58) Field of Search .................................. 134/6, 37, 42

(56) References Cited

FOREIGN PATENT DOCUMENTS

GB        2 283 906        *    5/1995

* cited by examiner

Primary Examiner—Zeinab El-Arini
(74) Attorney, Agent, or Firm—Timothy Thut Tyson; Ted Masters; Freilich, Hornbaker & Rosen

(57) ABSTRACT

A method for cleaning a vehicle (50) includes providing a can of compressed gas (20) having a nozzle (22), and an activating means for causing gas (26) to emanate from the nozzle (22); providing an absorbent member (36); providing a vehicle (50) having an inaccessible location (60) wherein moisture is disposed; pointing nozzle (22) in the direction of inaccessible location (60); activating the activating means causing gas (26) to emanate from nozzle (22) thereby extricating the moisture from the inaccessible location (60); and, using an absorbent member (36) to wipe off extricated moisture from the vehicle (50).

4 Claims, 6 Drawing Sheets

Fig_2

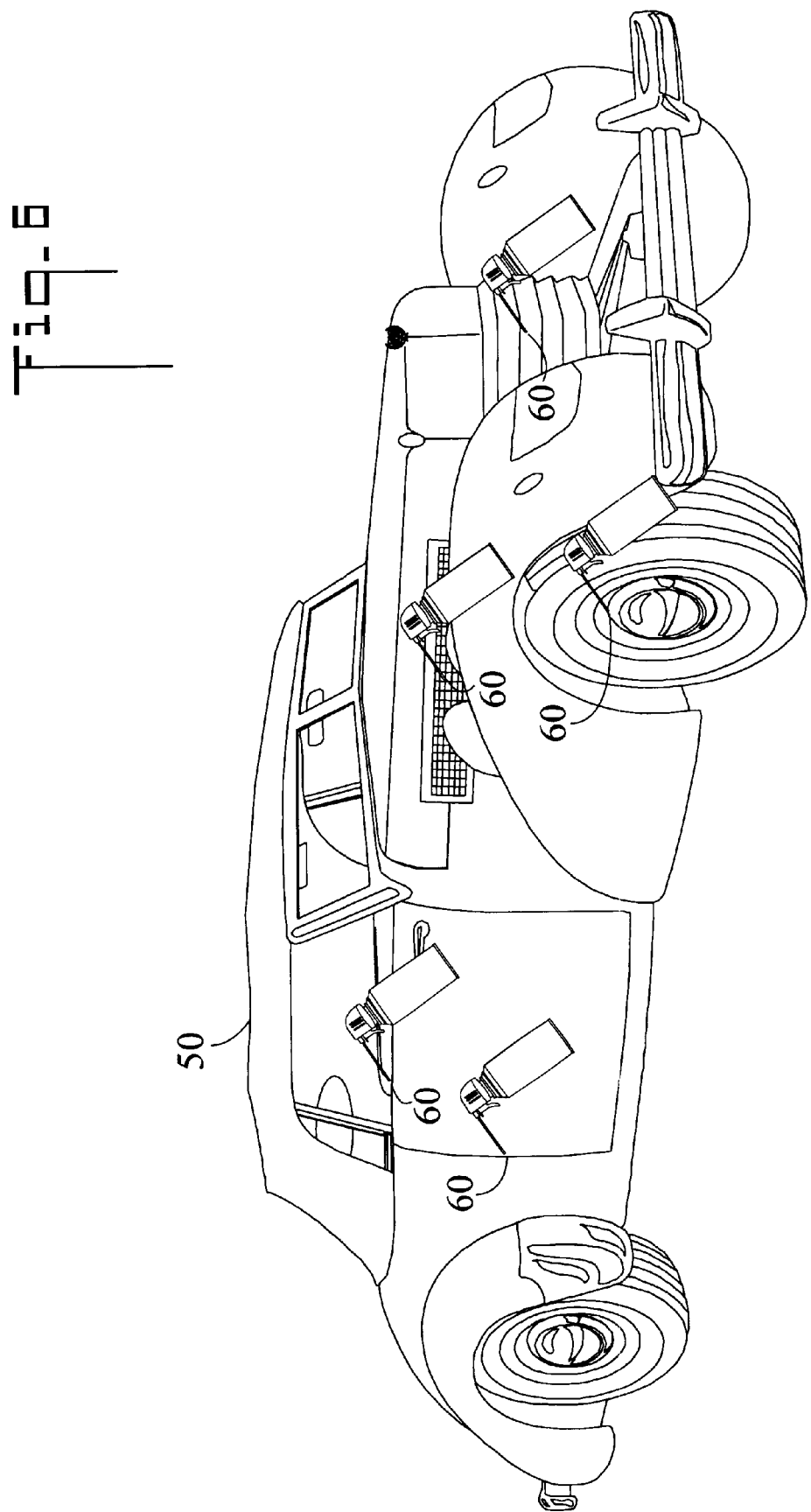

METHOD FOR USING A CAN OF COMPRESSED GAS TO CLEAN A VEHICLE

TECHNICAL FIELD

The present invention pertains generally to the cleaning of automobiles and other vehicles, and in particular to a method for using a can of compressed gas to blow moisture out of otherwise inaccessible locations on the vehicle.

BACKGROUND ART

Everyone likes to keep their vehicles clean and new looking. This requires occasionally taking the vehicle to a car wash, or alternatively, washing the vehicle at home. For many individuals who wash their own vehicles, there are many factors which should be considered. The first washing rule is never wash the vehicle in direct sunlight. This is because the heat from the sun will dry the water and soap on the surface as the vehicle is being washed, leaving residue spots on the vehicle. Conversely, washing the vehicle in the shade, or on a cloudy day, prevents these blemishes from appearing. The second washing rule is use lots of water. And when rinsing, be sure to rinse completely under any moldings, trim, chrome, mirrors, and wheel coverings. The final rule applies to drying the vehicle. The vehicle should not be allowed to passively drip dry, but rather should be actively dried before water spots can form. However, a problem exists with drying. Some parts of the vehicle comprise inaccessible locations where moisture collects, and cannot be eliminated with conventional absorbent members such as cloths, rags, towels, and sponges. These inaccessible locations include the areas under and around moldings, trim, chrome, mirrors, and wheel coverings. Commercial car wash facilities utilize pneumatic air to forcefully blow the moisture from the vehicle to prevent these areas from dripping water after the vehicle has been dried with absorbent members. However, when the vehicle is washed at home, no such air blowing capability is readily available. The present invention addresses this problem by utilizing a can of compressed gas to blow out moisture from inaccessible locations on the vehicle.

DISCLOSURE OF INVENTION

The present invention is directed to a method for cleaning vehicles whereby compressed gas is used to blow moisture out of inaccessible locations after the vehicle is washed. The present invention can be employed on virtually any type of vehicle such as cars, trucks, vans, Sport Utility Vehicles, motorhomes, trailers, motorcycles, and boats. After the vehicle is washed, rinsed, and dried with a dry cloth or other drying means, a can of compressed gas, preferably having an elongated dispensing tube, is positioned in the proximity of the moldings, trims, mirrors, and wheel covers. These locations typically collect moisture that cannot be reached with a wiping cloth. Compressed air is then released to blow away the residual moisture and prevent subsequent dripping which results in unsightly water spots. Any blown moisture which falls upon the surface of the vehicle is then simply wiped off with a cloth. Using the method of the present invention ensures a spot free exterior, or interior, and greatly enhances the appearance of the vehicle. A preferred name for the method of the present invention is "DRIP BLASTING".

In accordance with a preferred embodiment of the invention, a method for cleaning a vehicle comprises: providing a can of compressed gas having a nozzle and an activating means for causing the gas to emanate from the nozzle; providing an absorbent member; providing a vehicle having an inaccessible location wherein moisture is disposed; pointing the nozzle in the direction of the inaccessible location; activating the activating means causing the gas to emanate from the nozzle thereby extricating the moisture from the inaccessible location; and using the absorbent member to wipe off extricated moisture from the vehicle.

Other features and advantages of the present invention will become apparent from the following detailed description, taken in conjunction with the accompanying drawings, which illustrate, by way of example, the principles of the invention.

MODES FOR CARRYING OUT THE INVENTION

Figure 1:
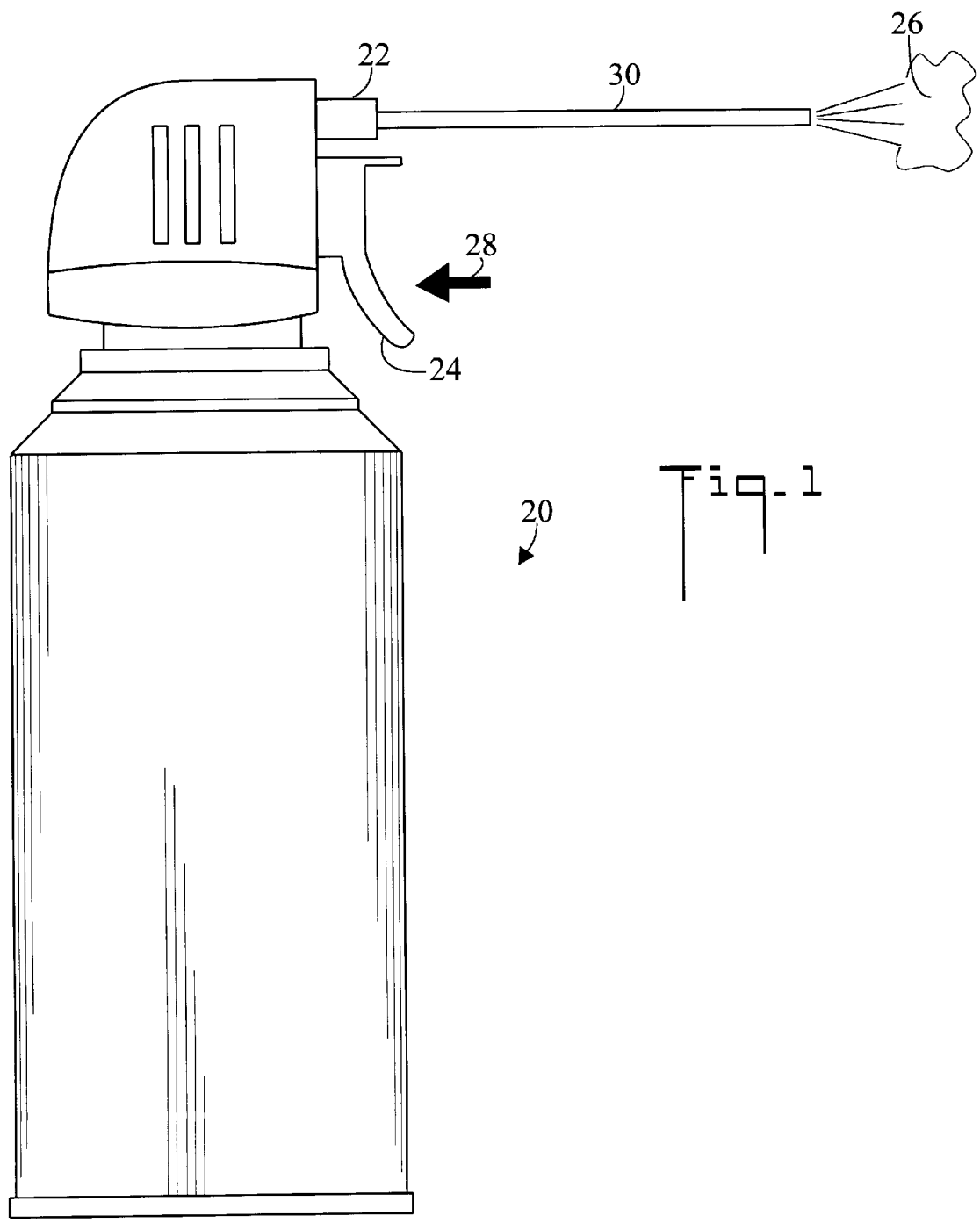
FIG. 1 is a side elevation view of a can of compressed gas that is used in the method of the present invention.

Referring initially to FIG. 1, there is illustrated a side elevation view of a can of compressed gas 20, which is used in the method of the present invention. The can of compressed gas 20 has a nozzle 22 and an activating means for causing gas 26 to emanate from nozzle 22. Activating means comprises a trigger 24 which when pulled in direction 28 releases gas 26. In the shown preferred embodiment, nozzle 22 includes an elongated dispensing tube 30 which allows gas 26 to be directed to a precise location on a vehicle. It is noted that the can of compressed gas 20 may also be used without the elongated dispensing tube 30.

Figure 2:
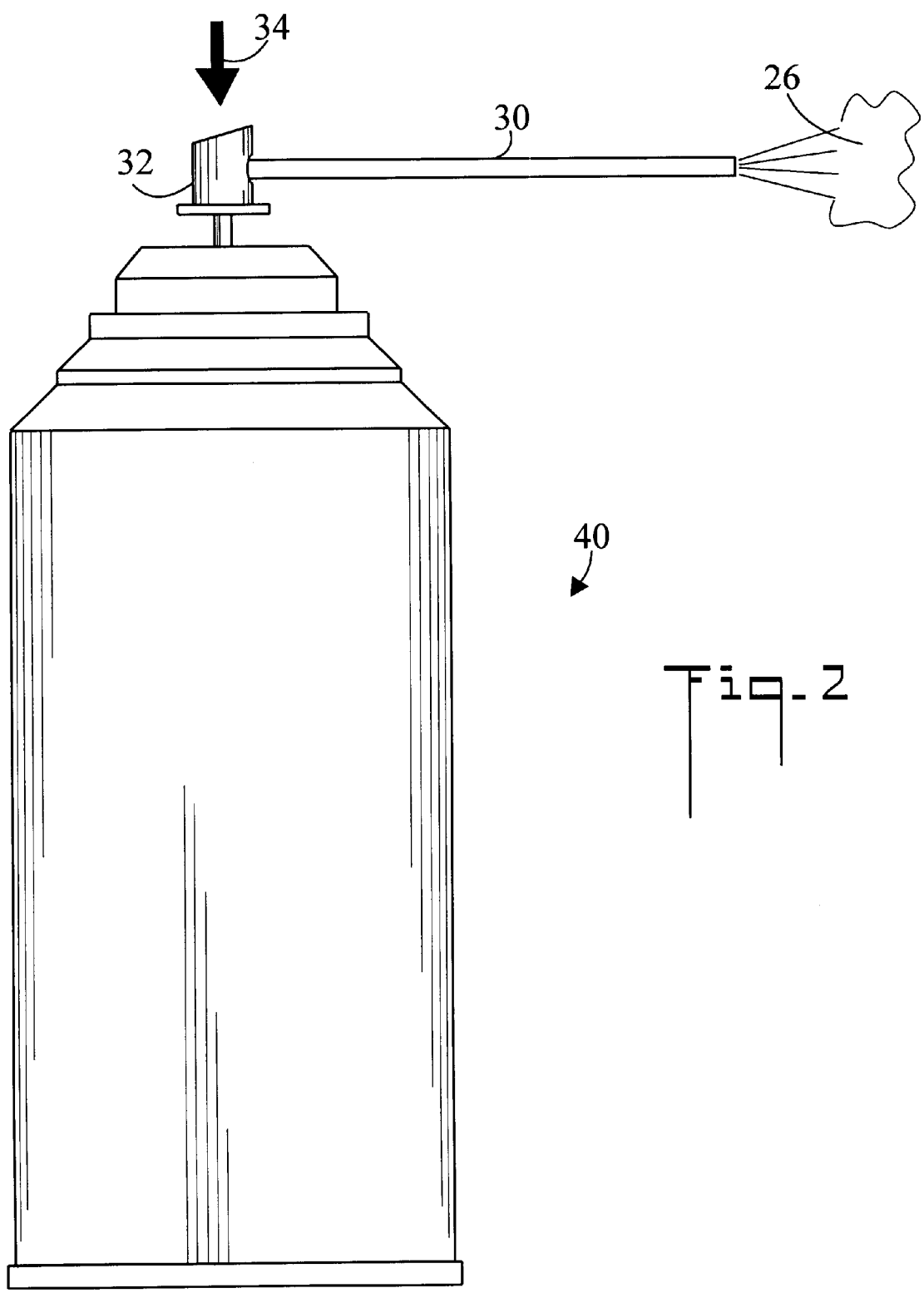
FIG. 2 is a side elevation view of a second can of compressed gas.

Referring now to FIG. 2, there is illustrated a side elevation view of a second can of compressed gas 40. The can of compressed gas 40 is similar to can 20, but has a different activating means. The activating means comprises a conventional push button nozzle 32 which when pushed downward in direction 34 releases gas 26.

Figure 3:
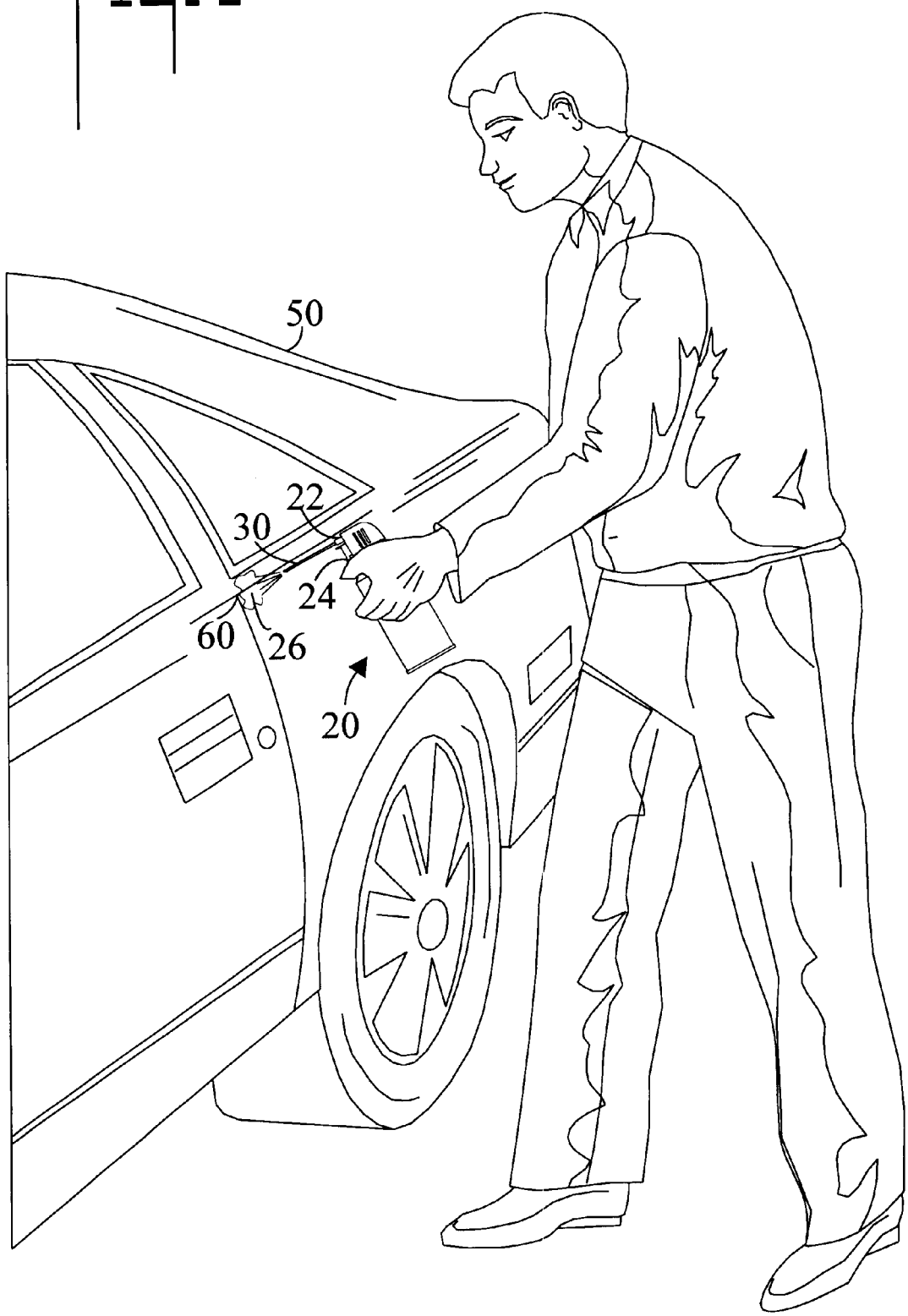
FIG. 3 is a perspective view of the can being used to blow moisture from inaccessible locations on a vehicle in accordance with the present method.

FIG. 3 is a perspective view of can 20 being used to blow out moisture which is disposed in an inaccessible location 60 on a vehicle 50 in accordance with the present method. Nozzle 22 is pointed in the direction of inaccessible location 60. Activating means, in the form of trigger 24, is activated causing gas 26 to emanate from nozzle 22 thereby extricating the moisture from inaccessible location 60. In the shown preferred embodiment, elongated dispensing tube 30 is attached to nozzle 22 in order to more accurately direct gas 26.

Figure 4:
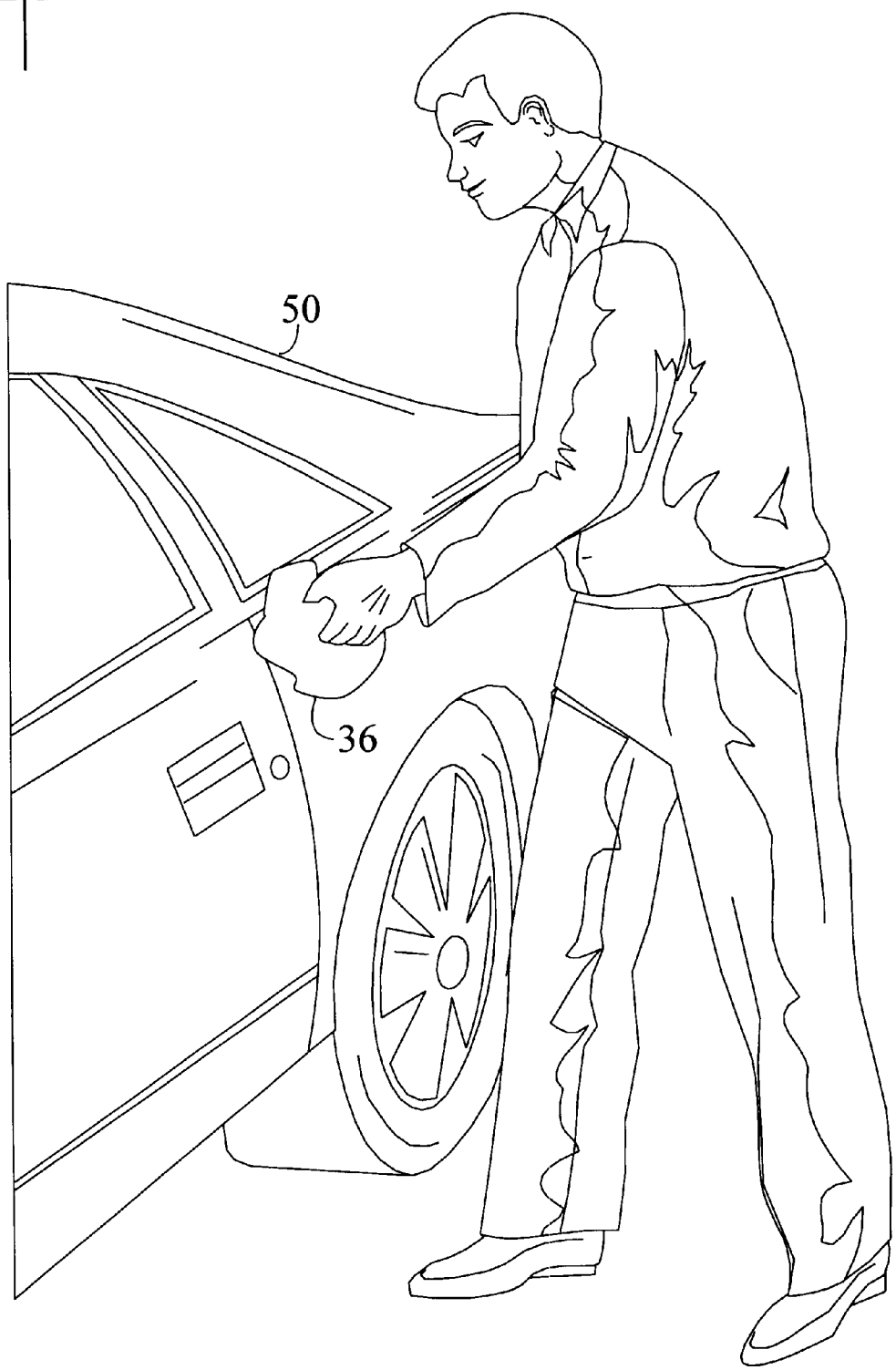
FIG. 4 is a perspective view of the blown moisture being wiped off the vehicle.

FIG. 4 is a perspective view of the extricated moisture being wiped off of vehicle 50 using an absorbent member 36, such as a soft cloth, towel, rag, or sponge. It may be readily appreciated that the steps of pointing nozzle 22, activating the activating means, and using absorbent member 36, may be repeated on another inaccessible locations 60 on vehicle 50.

Figure 5:
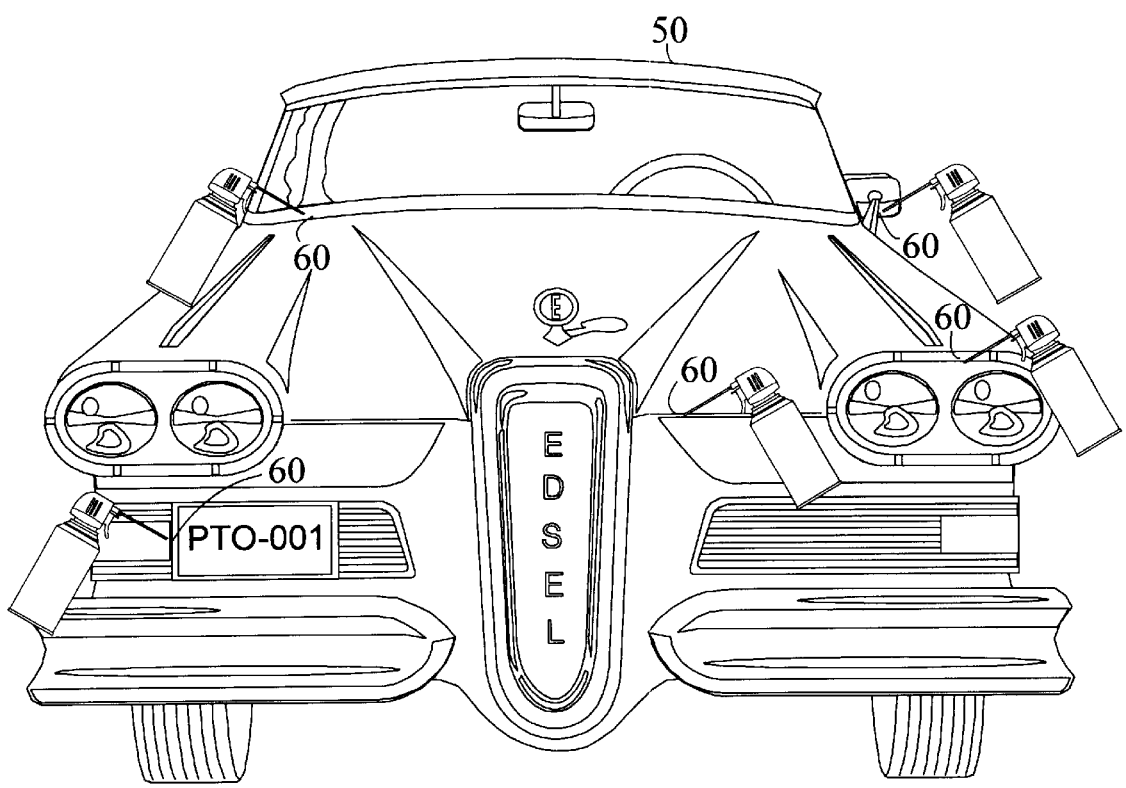
FIG. 5 is a front elevation view showing typical inaccessible locations on a vehicle; and, FIG. 6 is a perspective view showing typical inaccessible locations on a second vehicle.

FIG. 5 is a front elevation view showing typical inaccessible locations 60 on a vehicle 50.

FIG. 6 is a perspective view showing typical inaccessible locations 60 on a second vehicle 50.

As used herein, term "a can of compressed gas" embraces any spray can sized vessel which dispenses gas under pressure. These are typically cylindrical in shape such as in the form of a can of spray paint. Such a product is marketed under the name Duster™ II by, Kensington Technology Group, ACCO Brands, Inc., 2855 Campus Drive, San Mateo, Calif. 94403.

The preferred embodiments of the invention described herein are exemplary and numerous modifications, dimensional variations, and rearrangements can be readily envisioned to achieve an equivalent result, all of which are intended to be embraced within the scope of the appended claims.

What is claimed is:

1. A method for cleaning a vehicle, comprising:

providing a can of compressed gas having a nozzle, and an activating means for causing said gas to emanate from said nozzle, said nozzle including an elongated dispensing tube which allows said gas to be directed to a precise location on said vehicle;

providing an absorbent member;

providing a vehicle having an inaccessible location wherein moisture is disposed;

pointing said nozzle in a direction of said inaccessible location, wherein said gas is precisely directed at least one of moldings, trim, mirrors, and wheel covers;

activating said activating means causing said gas to emanate from said nozzle thereby extricating said moisture from said inaccessible location; and, using said absorbent member to wipe off extricated moisture from said vehicle.

2. The method according to claim 1, further including:

repeating pointing said nozzle, activating said activating means, and using said absorbent member, on another inaccessible location.

3. The method according to claim 1, wherein:

said absorbent member including a soft cloth.

4. The method according to claim 1, wherein:

said activating means including one of a trigger and a conventional push button nozzle.

* * * * *